United States Patent
Latwesen

(10) Patent No.: US 6,176,033 B1
(45) Date of Patent: *Jan. 23, 2001

(54) FISH BAITS, FISHING JIGS AND FISHHOOK ASSEMBLIES, AND METHODS OF ADHERING BAIT PROXIMATE FISHHOOKS

(76) Inventor: David G. Latwesen, 5107 W. Russett Ct., Spokane, WA (US) 99208

(*) Notice: Under 35 U.S.C. 154(b), the term of this patent shall be extended for 0 days.

This patent is subject to a terminal disclaimer.

(21) Appl. No.: 09/361,691

(22) Filed: Jul. 27, 1999

Related U.S. Application Data

(63) Continuation-in-part of application No. 09/276,977, filed on Mar. 26, 1999, now abandoned, which is a continuation-in-part of application No. 09/130,591, filed on Aug. 6, 1998, now Pat. No. 5,941,010.

(51) Int. Cl.[7] .......................... A01M 27/00; A01K 85/00; A23L 29/00; A01N 25/00
(52) U.S. Cl. ........................... 43/4.5; 43/1; 43/42; 426/1; 424/84; 424/410
(58) Field of Search ............................... 43/1, 42, 35, 55, 43/4, 4.5, 17.1, 42.53; 426/1; 424/84, 410

(56) References Cited

U.S. PATENT DOCUMENTS

| | | | |
|---|---|---|---|
| 3,788,641 | * | 1/1974 | Lemelson ............... 273/1 M |
| 3,926,792 | | 12/1975 | Buford .................... 209/636 |
| 4,850,129 | * | 7/1989 | Hoepfner et al. ............... 43/4 |
| 4,878,310 | | 11/1989 | Hannon et al. ........... 43/42.04 |
| 4,922,645 | * | 5/1990 | Hannon et al. ............ 43/42.4 |
| 5,274,947 | | 1/1994 | Griffiths .................. 43/44.2 |
| 5,464,613 | | 11/1995 | Barcay et al. ............. 424/84 |
| 5,778,824 | | 7/1998 | Musgrave et al. ........ 119/230 |
| 5,815,978 | | 10/1998 | Huddleston ............ 43/42.09 |
| 5,887,377 | * | 3/1999 | Birko ......................... 43/34 |
| 5,896,693 | * | 4/1999 | Ray ............................. 43/4 |
| 5,924,236 | * | 7/1999 | Preston .................. 43/42.31 |

FOREIGN PATENT DOCUMENTS

| | | | |
|---|---|---|---|
| 363207361A | 8/1988 | (JP) | ......... 43/4.5 |
| 403139263A | 6/1991 | (JP) | ......... 43/4.5 |
| 403272635A | 12/1991 | (JP) | ......... 43/4.5 |
| 405111352A | 5/1993 | (JP) | ......... 43/4.5 |
| 408107015A | 4/1996 | (JP) | ......... 43/4.5 |
| 410179102A | 7/1998 | (JP) | ......... 43/4.5 |

* cited by examiner

Primary Examiner—Michael J. Carone
Assistant Examiner—Fredrick T. French, III
(74) Attorney, Agent, or Firm—Wells, St. John, Roberts, Gregory & Matkin, P.S.

(57) ABSTRACT

In one aspect, the invention encompasses a fish bait comprising a fish attractant and at least one magnet within the fish attractant. In another aspect, the invention encompasses a fish bait comprising a fish attractant and a plurality of magnetizable particles distributed throughout the fish attractant to a concentration sufficient to adhere a visible amount of the fish attractant to a magnet. In yet another aspect, the invention encompasses a fishing bait and hook kit, comprising: a) a hook joined to a magnet; and b) a bait having one or more magnetizable particles distributed therein. In yet another aspect, the invention encompasses a jig comprising a fishhook, and a jighead joined to the fishhook. The jighead comprises a magnet. In yet another aspect, the invention encompasses a fishhook assembly comprising a fishhook, a magnet joined to the fishhook, and a plurality of magnetizable particles magnetically attracted to the magnet of the fishhook. The plurality of magnetic particles have bait adhered thereto. The bait is at least partially water soluble.

36 Claims, 7 Drawing Sheets

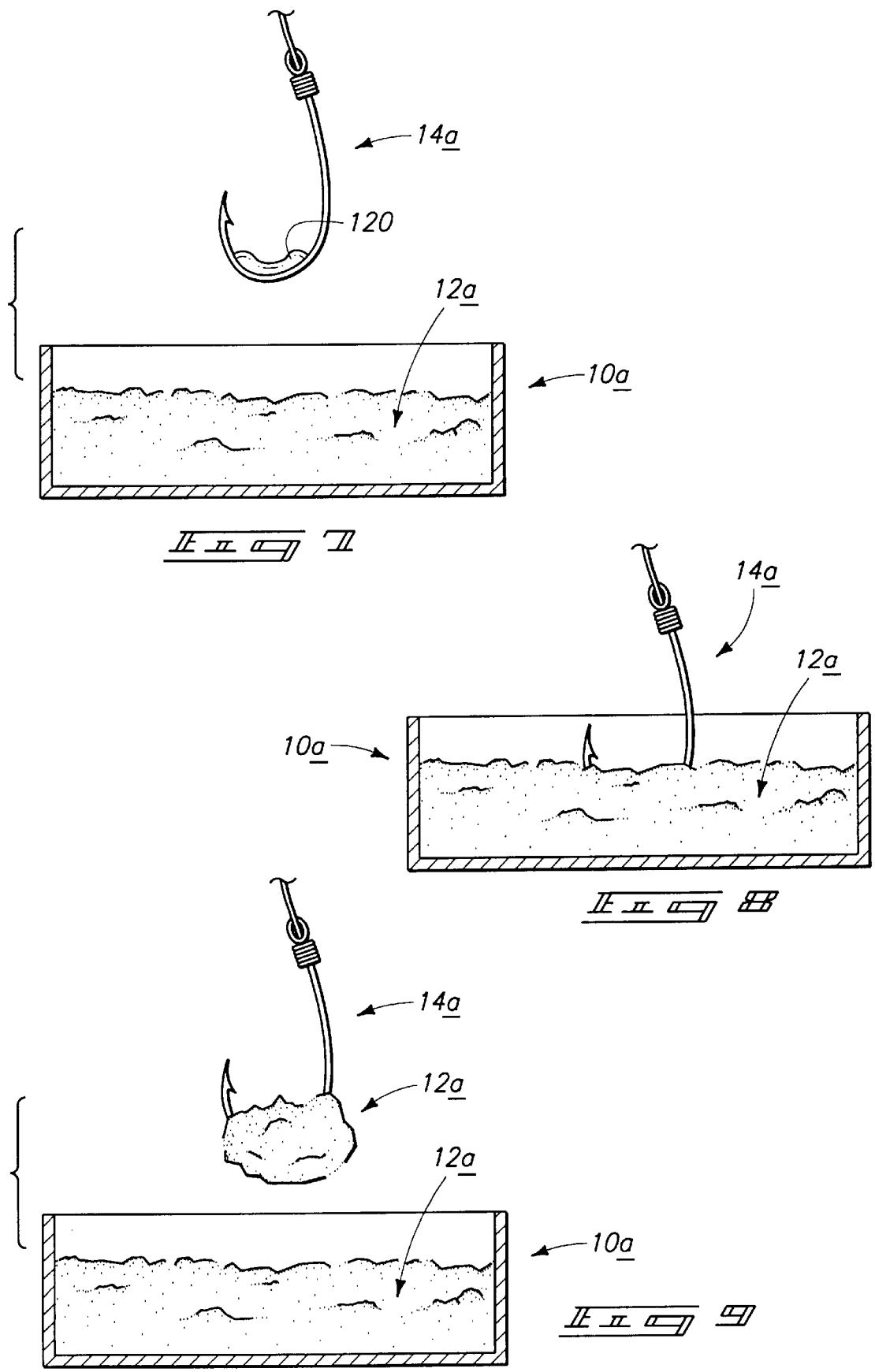

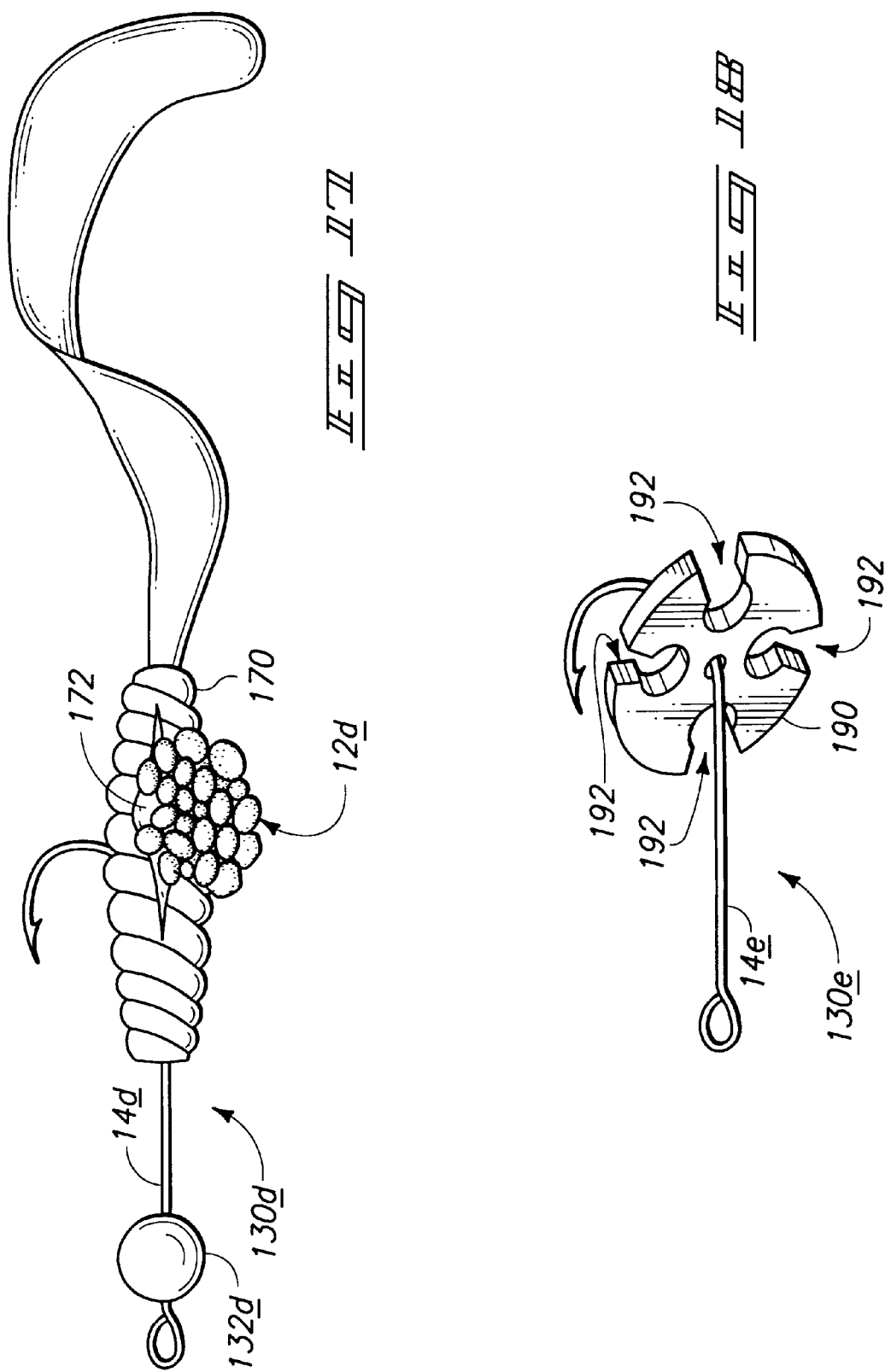

FISH BAITS, FISHING JIGS AND FISHHOOK ASSEMBLIES, AND METHODS OF ADHERING BAIT PROXIMATE FISHHOOKS

RELATED PATENT DATA

This application is a continuation-in-part of U.S. patent application Ser. No. 09/276,977, filed Mar. 26, 1999 now abandoned; which is a continuation-in-part of U.S. patent application Ser. No. 09/130,591, filed Aug. 6, 1998 now U.S. Pat. No. 5,941,010.

TECHNICAL FIELD

The invention pertains to fishing baits, fishing hooks, and kits comprising fishing baits and fishing hooks.

BACKGROUND OF THE INVENTION

Fishing baits commonly comprise relatively soft materials that are adhered to a fishhook either by, for example, molding the materials around the fishhook, or by impaling the materials onto the fishhook. Among the baits that are molded around a fishhook are baits having a relatively dough-like consistency such as, for example POWERBAIT®, which is distributed by Beckley of Spirit Lake, Iowa. Dough consistency baits can also be formed into small nuggets and impaled on a fishhook. For instance, POWERBAIT® nuggets are distributed by Beckley under the registered trademark "POWER NUGGET®". Other baits that can be molded or impaled onto fishhooks are, for example, marshmallows, small pieces of cheese, and kernels of corn.

A difficulty in using baits can occur in securing the baits to a hook. For instance, many of the dough-type baits can become difficult to work with when moistened. Specifically, the baits can become slimy and difficult to adhere to a hook. Also, many baits comprise one or more odoriferous fish attractants, the smell of which can be disagreeable or offensive to persons utilizing the baits. Accordingly, such persons would prefer to not manually touch the bait. Difficulties in securing baits to a hook can further be manifested by the baits falling off the hook prematurely upon casting a baited hook, or upon receiving a "nibble" from a striking fish. A nibble can occur when a fish lightly touches or "tastes" the bait, and before the fish fully envelops the baited hook in its mouth.

A particular application in which it would be advantageous to improve adherence of bait to a fishing hook is ice fishing. In such application, the fisherman typically is wearing gloves, and it can be exceptionally difficult to bait a hook.

For the above-discussed reasons, it would be desirable to develop improved baits which can be adhered to a hook without actually touching the baits, and which can be retained on a hook better than some of the existing baits.

SUMMARY OF THE INVENTION

In one aspect, the invention encompasses a fish bait comprising a fish attractant and at least one magnet within the fish attractant.

In another aspect, the invention encompasses a fish bait comprising a fish attractant and at least one magnetizable particle within the fish attractant. The magnetizable particle is positioned within the attractant at a location wherein it can adhere the attractant to a fishhook under conditions wherein one or both of the magnetizable particle and the fishhook is magnetized.

In yet another aspect, the invention encompasses a fishing bait and hook kit. Such kit includes a magnetic hook and a bait having one or more magnetizable particles distributed therein.

In yet another aspect, the invention encompasses a jig comprising a fishhook, and a jighead joined to the fishhook. The jighead comprises a magnet.

In yet another aspect, the invention encompasses a fishhook assembly comprising a fishhook, a magnet joined to the fishhook, and a plurality of magnetizable particles magnetically attracted to the magnet of the fishhook. The plurality of magnetizable particles have bait adhered thereto. The bait is at least partially water soluble.

BRIEF DESCRIPTION OF THE DRAWINGS

Preferred embodiments of the invention are described below with reference to the following accompanying drawings.

FIG. 1 illustrates a preliminary stage of a method of baiting a fishhook in accordance with the present invention.

FIG. 7 is a cross-sectional, diagrammatic, fragmentary view of a fish bait encompassed by the present invention, and a fishhook assembly encompassed by the present invention. FIG. 7 illustrates a preliminary stage of a method of baiting a fishhook in accordance with the present invention.

FIG. 8 illustrates the bait and fishhook of FIG. 7, at a fishhook-baiting step subsequent to that of FIG. 7.

FIG. 9 illustrates the bait and fishhook of FIG. 7, at a fishhook-baiting step subsequent to that of FIG. 8.

FIG. 10 illustrates a preliminary stage of a method of baiting a fishhook in accordance with the present invention.

FIG. 17 illustrates another embodiment fishhook assembly of the present invention.

FIG. 18 illustrates another embodiment fishhook assembly of the present invention.

DETAILED DESCRIPTION OF THE PREFERRED EMBODIMENTS

Figure 1:
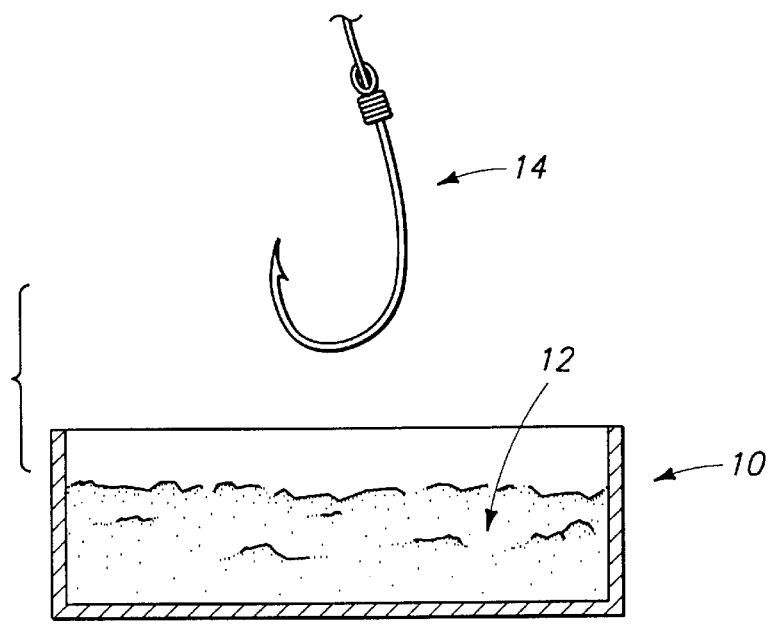
FIG. 1 is a cross-sectional, diagrammatic, fragmentary view of a fish bait encompassed by the present invention, and a fishhook.

This disclosure of the invention is submitted in furtherance of the constitutional purposes of the U.S. Patent Laws "to promote the progress of science and useful arts" (Article 1, Section 8).

In one aspect, the invention encompasses a fish bait comprising a fish attractant and one or more magnetizable particles distributed throughout the fish attractant. The fish attractant can comprise, for example, a consistency of a dough or a gel, and can, for example, comprise POWERBAIT®. Alternatively, the attractant can be in the form of a powder. As yet another alternative, the attractant can be in the form of a marshmallow, piece of cheese, piece of corn, etc. In particular embodiments, the fish attractant can have a visible appearance which attracts fish, and can comprise, for example, glitter. In preferred embodiments of the invention, the fish attractant will release particles when exposed to water, with the particles being detectable by fish through at least one of the senses of smell and taste.

The magnetizable particles are preferably provided within the bait to a concentration sufficient to adhere a visible amount of the fish attractant to a metallic fishhook under conditions wherein either 1) some of the magnetizable particles are magnetic, 2) the fishhook is magnetic, or 3) both the fishhook and at least some of the metallic particles are magnetic.

For purposes of interpreting this disclosure and the claims that follow, the terms "magnetizable," "magnet" and "magnetic" are defined as follows. The term "magnet" indicates an object that is itself a so-called "permanent magnet". A "permanent magnet" being defined in accordance with the art to be a magnet that retains a remnant magnetic field in the absence of an external magnetizing field. Thus, if a fishhook is referred to as a magnet, it is meant that the fishhook has a remnant magnetic field in the absence of any magnet external to the fishhook. The term "magnetic" refers to an object that is either itself a magnet, or that is magnetized because it is in magnetic contact with a magnet or an electric field. Thus, the term "magnetic fishhook" encompasses fishhooks that are magnets, as well as fishhooks that, while not magnets themselves, are magnetized by interaction with a magnet. An exemplary configuration of a magnetic fishhook which is not itself a magnet is a fishing lure comprising a magnet in physical contact with the hook. Finally, the term "magnetizable" refers to particles which can be magnetized by an external magnetic field. In conformance with the preceding definitions of "magnet" and "magnetic," magnetizable particles are magnetic if they are formed into permanent magnets, or if they are magnetized by interaction with a magnet.

Also for purposes of interpreting this disclosure and the claims that follow, a "visible amount" of bait is defined to refer to a size and/or quantity of bait visible to a person of ordinary vision, from arm's length, under daylight conditions.

Referring again to a bait encompassed by the present invention, such bait preferably comprises magnetizable particles distributed therein which comprise ferromagnetic components. Such ferromagnetic components can comprise one or more of iron, nickel and cobalt. An amount of magnetic adhesion between a hook and magnetizable particles within a fish bait can be varied by altering an amount of ferromagnetic materials within the hook and/or within the magnetizable particles of the fish bait. Accordingly, to increase adhesion of a fish bait to a hook, the amount of ferromagnetic materials in the hook and/or in the magnetizable particles can be increased.

The magnetizable particles can be in the form of, for example, metal filings, a powder, or a powder trapped in organic polymer. Powders trapped in organic polymers can be advantageous over other magnetizable materials in that corrodible components of the magnetizable materials can be protected from corrosion by the organic polymer.

At least some of the magnetizable particles distributed in the bait can be magnets. Such particles will then adhere to fishhooks comprising iron or other ferromagnetic materials. The magnet particles can be in the form of flecks or other small pieces, and can comprise, for example, ground portions of a flexible magnet. Flexible magnets commonly comprise magnetic particles trapped within an organic polymer. Flexible magnets can be purchased as extruded flexible strips. (Exemplary flexible magnets are sold by Magnet Sales & Manufacturing of Culver City, Calif.)

In alternative embodiments of the invention, none of the magnetizable particles within the bait are magnets. In such embodiments, the magnetizable particles can be used in conjunction with a fishhook that is magnetic, and will thus adhere to the fishhook.

In yet other alternative embodiments, at least some of magnetizable particles can be magnets, and can be used together with a fishhook that is also a magnet. In such embodiments, the magnetizable particles can adhere more tightly to the fishhook than they would in embodiments wherein either the magnetizable particles or the fishhook were not a magnet.

In embodiments wherein the magnetizable particles are dispersed throughout a powdered fish bait, gel fish bait, or dough-type fish bait, the particles are preferably relatively small. Small particles can generally be more easily homogeneously dispersed throughout a fish bait than large particles. Exemplary particles for dispersing in powder baits, gel baits or dough baits have a minimum dimension of greater than 0 inch and a maximum dimension of less than about 0.25 inch. The magnetizable particles are preferably provided within the bait to a concentration of greater than about 1% by weight, and can be provided to, for example, a concentration from about 1% to about 99.9% by weight, or, as another example, a concentration of from about 25% to about 95%, by weight.

An embodiment of the present invention wherein magnetizable particles are dispersed in a bait is described with reference to FIGS. 1–3. FIG. 1 illustrates a vessel 10 containing a fish bait 12 comprising magnetizable particles, and a metal-containing fishhook 14 provided above bait 12. Either fishhook 14 is a magnet, or at least some of the magnetizable particles are magnets, or both the fishhook and at least some of the magnetizable particles are magnets.

Fish bait 12 can, for example, have a granular consistency and comprise magnetizable particles coated with a powdered fish attractant. Fish bait 12 can be formed by, for example, providing an adhesive over magnetizable particles and subsequently dusting the adhesive-covered particles with a fish attractant powder. The adhesive adheres the powder to the magnetizable particles. The magnetizable particles can be formed by, for example, grinding a flexible magnet. A suitable adhesive can comprise, for example, a glue or paste, and can be applied to the magnetizable particles by, for example, spraying or dipping. A suitable fish attractant powder can be formed by, for example, crushing fish food (for example, Purina® Trout Chow, which is available from Ralston Purina Company of St. Louis, Mo.) into a dust. The powder can further comprise particles which sparkle, such as, for example, glitter.

Figure 2:
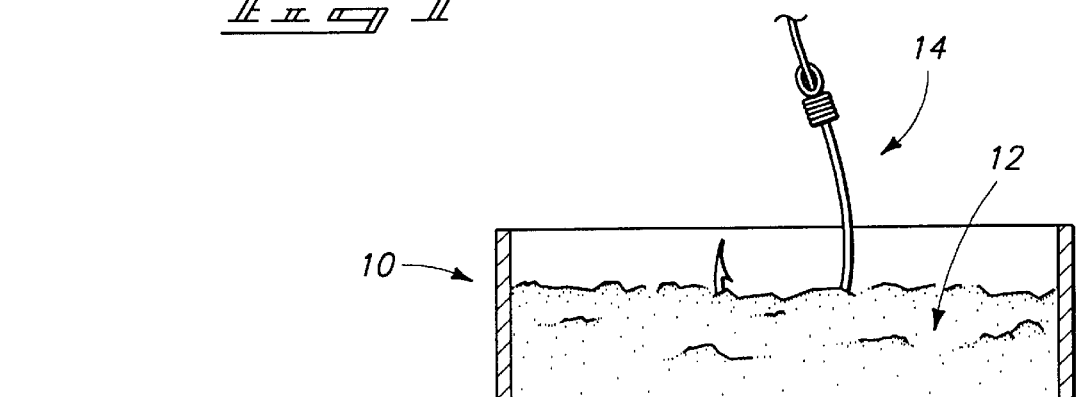
FIG. 2 illustrates the bait and fishhook of FIG. 1, at a fishhook-baiting step subsequent to that of FIG. 1.

Referring to FIG. 2, fishhook 14 is dipped into bait 12. The magnetizable particles then adhere to fishhook 14 through magnetic interactions to adhere a visible amount of bait 12 to fishhook 14.

Figure 3:
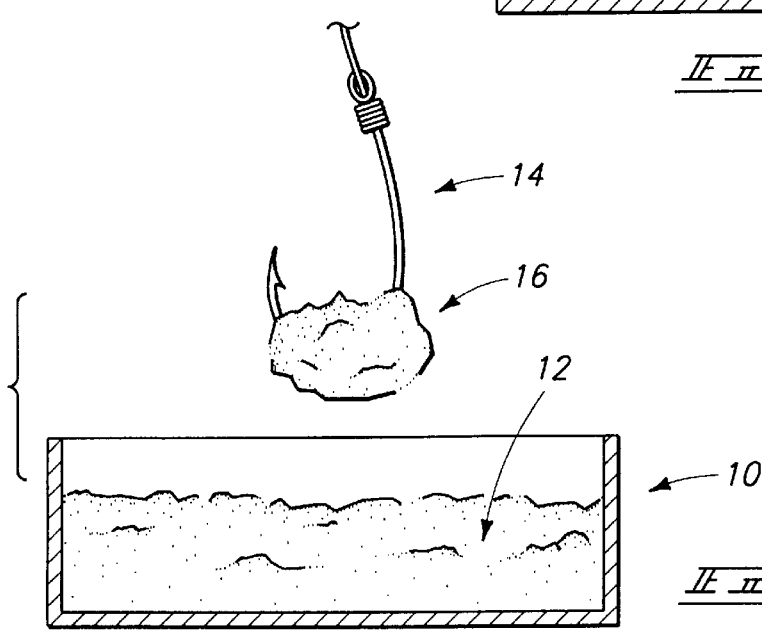
FIG. 3 illustrates the bait and fishhook of FIG. 1, at a fishhook-baiting step subsequent to that of FIG. 2.

Referring to FIG. 3, fishhook 14 is withdrawn from vessel 10. Fishhook 14 is now coated with a visible portion 16 of bait 12.

The embodiment of the invention described in FIGS. 1–3 can be utilized by a person to bait a hook without such person actually touching bait 12. The invention encompasses other embodiments wherein magnetizable particles are distributed throughout a bait, and wherein the bait is subsequently molded to a hook or embedded over the tip of the hook. Such alternative embodiments can comprise, for example, distributing magnetizable particles throughout a dough-type bait.

Figure 4:
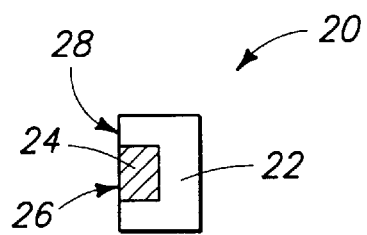
FIG. 4 illustrates a cross-sectional, fragmentary, diagrammatic view of a second embodiment bait of the present invention.

Another embodiment of the invention is described with reference to FIGS. 4 and 5. Referring to FIG. 4, a bait 20 is shown in cross-sectional side view. Bait 20 comprises a block of fish attractant material 22, and a magnetizable particle 24 embedded within block 22. Block 22 can comprise, for example, a marshmallow, piece of cheese, or piece of corn. Alternatively, block 22 could comprise a dough-type bait molded into the shape of block 22. Magnetizable particle 24 can be a magnet. The size of magnetizable particle 24 can vary depending on the size of block 22. Preferably, magnetizable particle 24 will comprise at least about 1% of the weight of bait 20, and particle 24 can comprise greater than 10% of the weight of bait 20. In the shown embodiment, only one magnetizable particle is provided within block 22. However, it is to be understood that the invention encompasses other embodiments wherein more than one magnetizable particle is provided within a single block 22 of bait 20.

The shown magnetizable particle 24 comprises an exposed outer surface 26 which is substantially planar with an outer peripheral surface 28 of block 22 proximate to exposed surface 26. The invention covers other embodiments (not shown) wherein exposed outer surface 26 is either recessed relative to outer peripheral surface 28, or projects outwardly further than outer surface 28, as well as other embodiments (not shown) wherein magnetizable particle 24 is embedded within block 22 to an extent such that no surface of magnetizable particle 24 is exposed.

Figure 5:
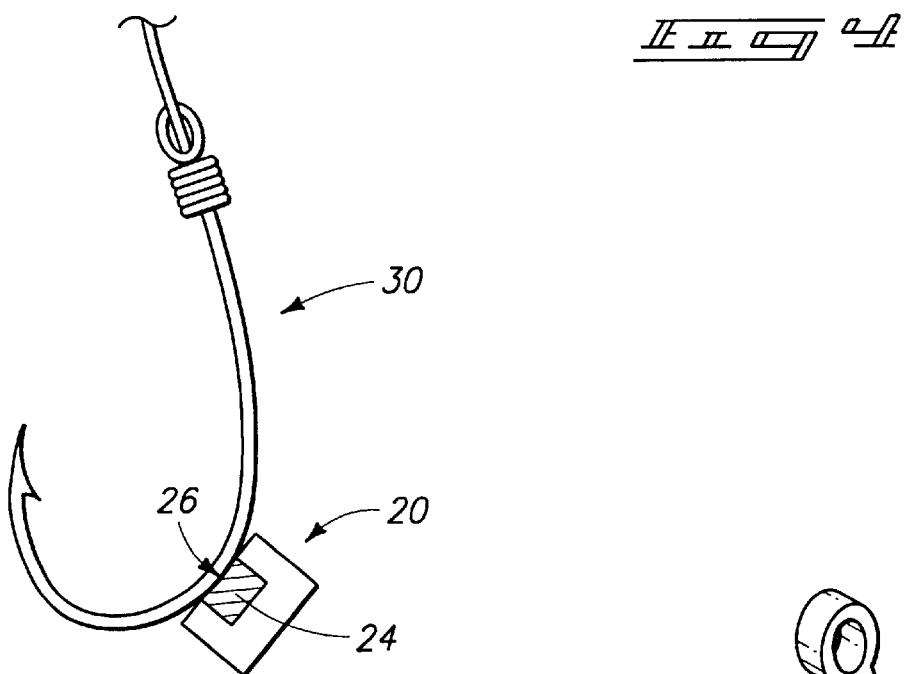
FIG. 5 illustrates the bait of FIG. 4 adhered to a fishhook.

Referring to FIG. 5, bait 20 is shown adhered to a metallic fishhook 30. One or both of magnetizable particle 24 and fishhook 30 is a magnet, and magnetizable particle 24 adheres to fishhook 30 through magnetic forces. An advantage of having surface 26 of particle 24 exposed is that magnetic attraction between particle 24 and hook 30 is strongest when a distance between particle 24 and hook 30 is minimized. By enabling outer surface 26 to physically contact hook 30, magnetic interactions between hook 30 and magnetizable particle 24 can be maximized.

It is noted that the shown embodiment can enable hook 30 to be adhered to bait 20 without a person actually touching bait 20. Rather, bait 20 can be within a jar or other vessel, and hook 30 inserted into the jar until one or more of baits 20 adhere to hook 30 through magnetic interactions. Hook 30 can then be withdrawn with the baits adhered thereto.

Figure 6:
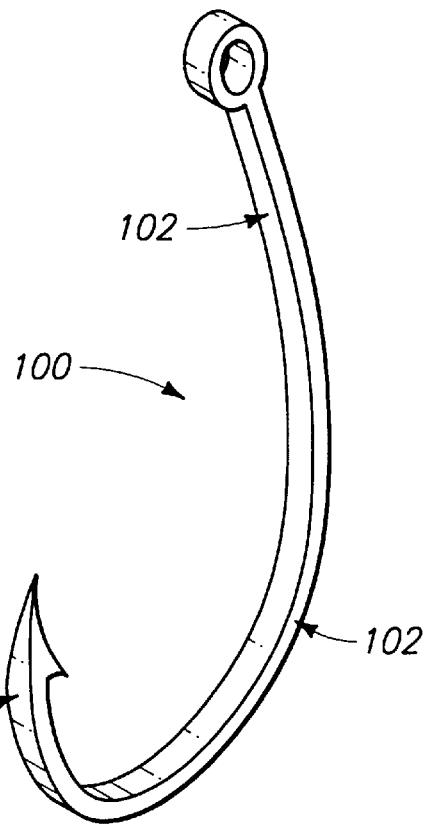
FIG. 6 is a diagrammatic, perspective view of a fishhook embodiment of the present invention.

FIG. 6 illustrates yet another embodiment of the invention wherein a fishhook 100 is formed to have planar side regions. In the shown embodiment, fishhook 100 is formed of a wire having a square cross-section. Hook 100 thus comprises four planar side regions 102 (only three of which are visible in the FIG. 6 view). Planar side regions 102 can improve magnetic adhesion between hook 100 and magnetizable particles. Specifically, in embodiments which magnetizable particles have planar surfaces, the embodiment of FIG. 6 can enable a larger portion of the planar surfaces of the magnetizable particles to physically contact surfaces of the hook than would occur if hook 100 lacked the planar surfaces 102. The additional surface contact can increase magnetic adhesion forces between hook 100 and the magnetizable particles. In the shown embodiment, the planar side regions 102 extend entirely along a length of hook 100. However, it is to be understood that the invention encompasses other embodiments (not shown) wherein planar regions are provided along only portions of hook 100.

In another aspect of the invention, the invention encompasses kits comprising a bait having one or more magnetizable particles distributed therein in combination with fishhooks that are magnetic. In such kits the bait would typically be provided in a first container (such as a jar), and the hooks would be provided in a separate second container (such as a bag or box). The two containers would then together comprise the kit. An advantage of providing the bait and hooks together as kits is that such kits can provide a convenient packaging for consumers of fishing supplies. Specifically, for consumers intending to utilize magnetizable-particle containing fish bait in combination with a fishhook that is magnetic (rather than in combination with an ordinary metallic fishhook that is not magnetic), it can be more convenient to purchase the magnetic fishhooks and the bait comprising magnetizable particles as a single package, rather than having to search store shelves for separated packages of the individual kit components.

Another embodiment of the present invention is described with reference to FIGS. 7–9. In referring to FIGS. 7–9, similar numbering to that utilized above in describing the embodiment of FIGS. 1–3 will be used, with the suffix "a" utilized to indicate structures pertaining to the embodiment of FIGS. 7–9.

Referring to FIG. 7, a vessel 10a contains a fish bait 12a comprising magnetic particles. A fishhook 14a is provided above bait 12a. Fishhook 14a can comprise a metal, or other material. A magnet 120 is adhered to fishhook 14a. Magnet 120 can be adhered by, for example, epoxy. Magnet 120 can be configured to be retained within a curved portion of hook 14a (as shown), and in the shown embodiment, has a curved shape complementary to the curved portion of hook 14a. It is to be understood, however, that the invention encompasses other embodiments wherein magnet 120 has other shapes and is retained at other locations of hook 14a.

Bait 12a preferably comprises a combination of fish attractant and magnetizable particles, and more preferably the magnetizable particles are magnets. Bait 12a can comprise, for example, a powder adhered to magnetizable particles utilizing a glue. The fish attractant preferably comprises at least a portion which is soluble in water, and which emits fish-attracting odoriferous materials upon being submerged in water.

Referring to FIG. 8, fishhook 14a is dipped into bait 12a. The magnetizable particles then adhere to one or both of fishhook 14a and magnet 120 through magnetic interactions to adhere a portion of bait 12a proximate fishhook 14a.

Referring to FIG. 9, fishhook 14a is withdrawn from vessel 10a, and magnet 120 is now coated with at least some of bait 12a. Preferably, magnet 120 is coated with a visible portion of bait 12a. Although in the shown embodiment, magnet 120 is dipped within bait 12a, it is to be understood that the invention encompasses embodiments wherein magnet 120 magnetizes fishhook 14a, and wherein it is only the magnetized fishhook which is dipped within bait 12a, rather than the fishhook 14a and the magnet 120.

Another embodiment of the invention is described with reference to FIGS. 10–12. In referring to FIGS. 10–12, similar numbering will be used to that utilized above in describing the embodiment of FIGS. 1–3, with the suffix "b" provided to indicate structures pertaining to the embodiment of FIGS. 10–12.

Figure 10:
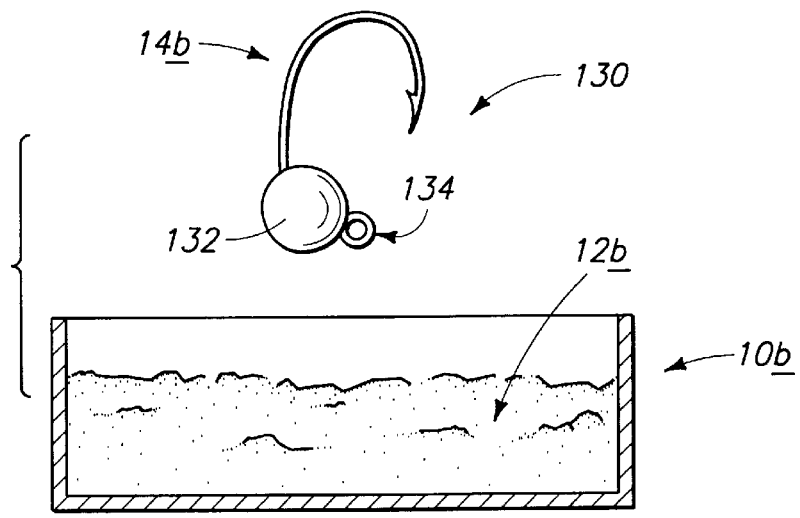
FIG. 10 is a cross-sectional, diagrammatic, fragmentary view of a fish bait encompassed by the present invention, and another embodiment fishhook assembly of the present invention.

Referring to FIG. 10, a vessel 10b comprises a bait 12b. Bait 12b preferably comprises a combination of magnetizable particles (preferably magnets) and fish attractant. Preferably, at least some of the fish attractant becomes soluble upon being submerged in water to emit odoriferous particles within the water which can be detected by fish.

A fishing lure 130 is provided. Fishing lure 130 is shown as a jig comprising a fishhook 14b and a jighead 132 bound to fishhook 14b. At least a portion of jighead 132 is preferably a magnet, and in more preferred embodiments an entirety of jighead 132 is a magnet. Jighead 132 can be formed on hook 14b by, for example, bonding the jighead to hook 14b with epoxy, or pressing a magnetic powder around hook 14b to mold the powder into a shape of jighead 132. Jig 130 comprises an eye 134 for attachment to a fishing line. In preferred embodiments, jighead 132 is in a location proximate eye 134.

Figure 11:
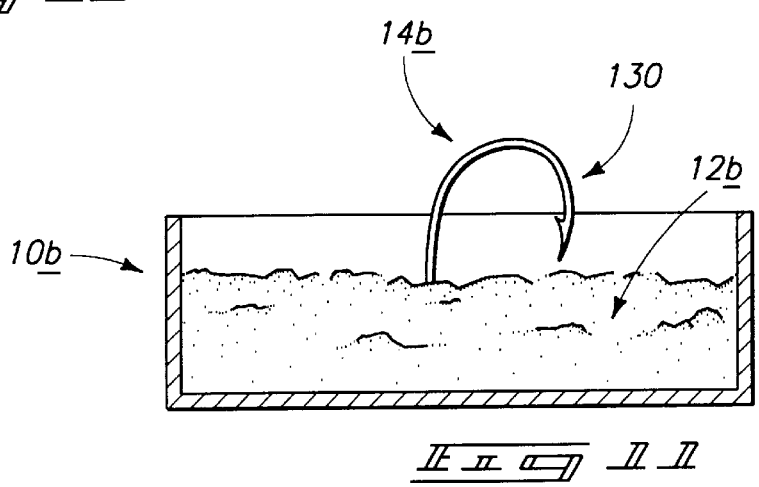
FIG. 11 illustrates the bait and fishhook of FIG. 10, at a fishhook-baiting step subsequent to that of FIG. 10.
Figure 12:
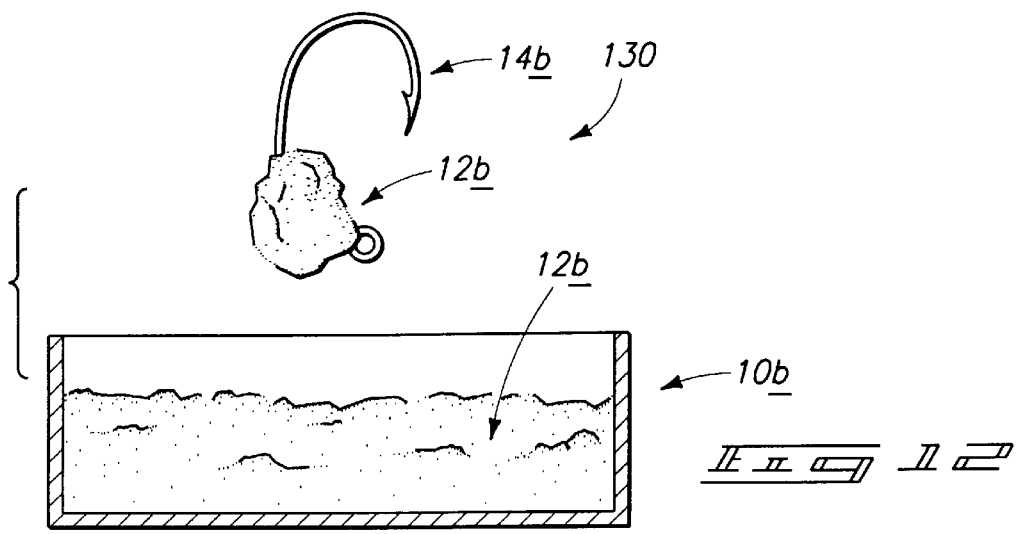
FIG. 12 illustrates the bait and fishhook of FIG. 10, at a fishhook-baiting step subsequent to that of FIG. 11.

Referring to FIGS. 11 and 12, jighead 132 is submerged within bait 12b and subsequently withdrawn from bait 12b. A portion of bait 12b is magnetically adhered to jighead 132 after jighead 132 is withdrawn from bait 12b. Specifically, the magnetizable particles within bait 12b are magnetically attracted to the magnet of jighead 132 and are accordingly adhered to jighead 132 by magnetic forces.

Figure 13:
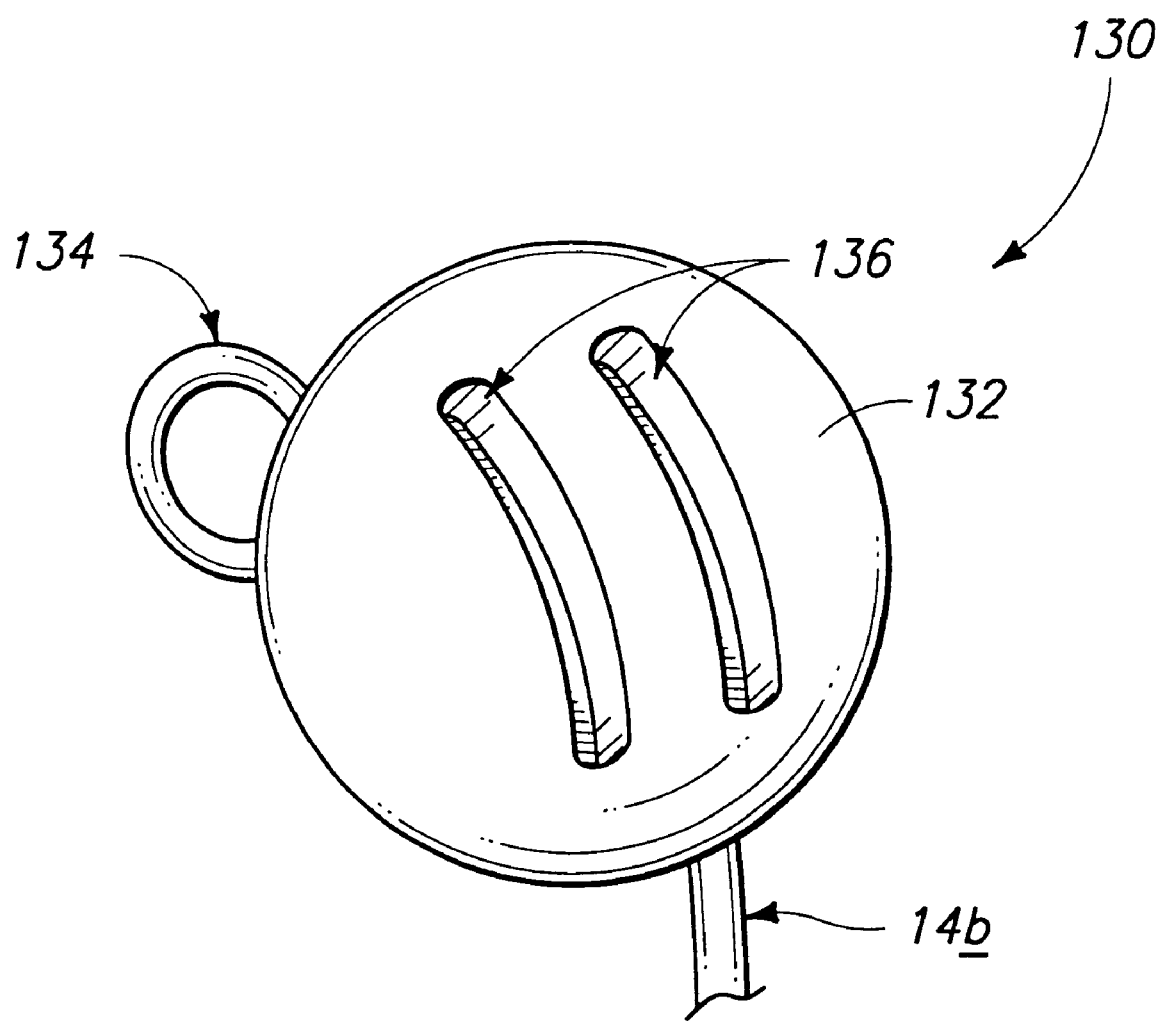
FIG. 13 illustrates a diagrammatic, perspective, fragmentary enlarged view of a jighead encompassed by the present invention.

A particular embodiment of jig 130 is described with reference to FIG. 13. Specifically, FIG. 13 shows an expanded view of jighead 132, and shows indentations 136 (shown as grooves) extending within jighead 132. Grooves 136 are preferably sized so that at least some of the magnetizable particles of bait 12a extend at least partially within grooves 136. More preferably, grooves 136 are sized so that at least some of the magnetizable particles of bait 12a are entirely within grooves 136. Grooves 136 can help to retain magnetic bait 12a onto a jig during casting and retrieving associated with a fishing application. Although in the shown embodiment indentations 136 are shown as grooves, it is to be understood the invention encompasses other embodiments wherein indentations 136 are holes, cavities, or other shapes of orifices.

Another embodiment of the invention is described with reference to FIGS. 14–16. In referring to FIGS. 14–16, similar numbering will be used to that utilized above in describing the embodiment of FIGS. 10–12, with the suffix "c" provided to indicate structures pertaining to the embodiment of FIGS. 14–16.

Figure 14:
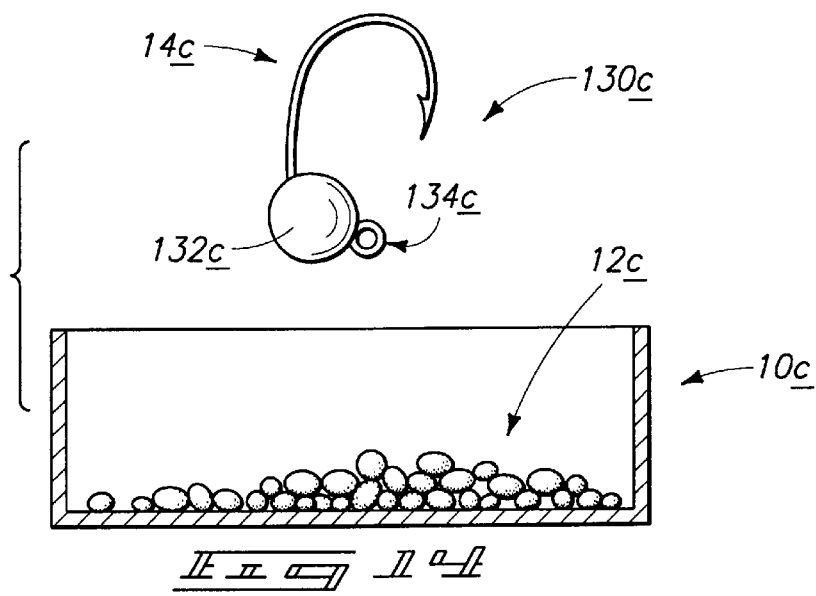
FIG. 14 is a cross-sectional, diagrammatic, fragmentary view of another embodiment fish bait encompassed by the present invention, and illustrates a preliminary stage of a method of baiting a fishhook in accordance with the present invention.

Referring to FIG. 14, a vessel 10c comprises a bait 12c. Bait 12c preferably comprises a combination of magnetizable particles (preferably magnets) and fish attractant. Preferably, at least some of the fish attractant becomes soluble upon being submerged in water to emit odoriferous particles within the water which can be detected by fish. The bait has been formed into a plurality of discrete pellets. In particular embodiments, the bait is formed by kneading a dough-type bait (such as, for example, POWERBAIT®) with a plurality of magnet particles to form a mixture, and subsequently shaping the mixture into discrete pellets.

A fishing lure 130c is provided. Fishing lure 130c is shown as a jig comprising a fishhook 14c and a jighead 132c bound to fishhook 14c. At least a portion of jighead 132c is preferably a magnet, and in more preferred embodiments an entirety of jighead 132c is a magnet. Jighead 132c can be formed on hook 14c by, for example, bonding the jighead to hook 14c with epoxy, or pressing a magnetic powder around hook 14c to mold the powder into a shape of jighead 132c. Jig 130c comprises an eye 134c for attachment to a fishing line. In preferred embodiments, jighead 132c is in a location proximate eye 134c.

Figure 15:
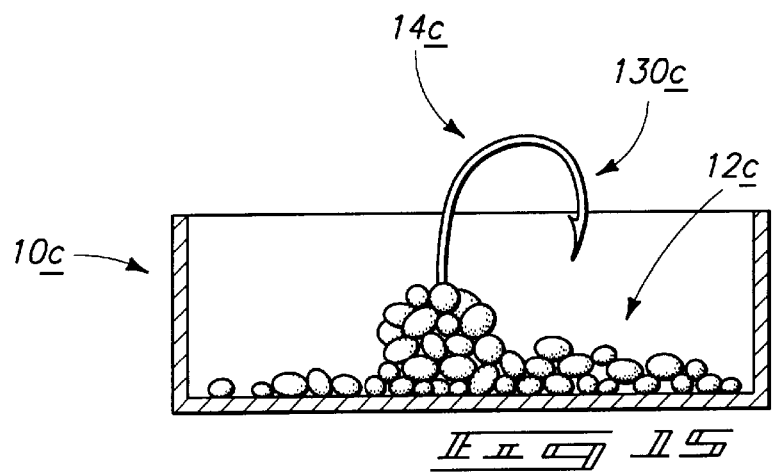
FIG. 15 illustrates the bait and fishhook of FIG. 14, at a fishhook-baiting step subsequent to that of FIG. 14.
Figure 16:
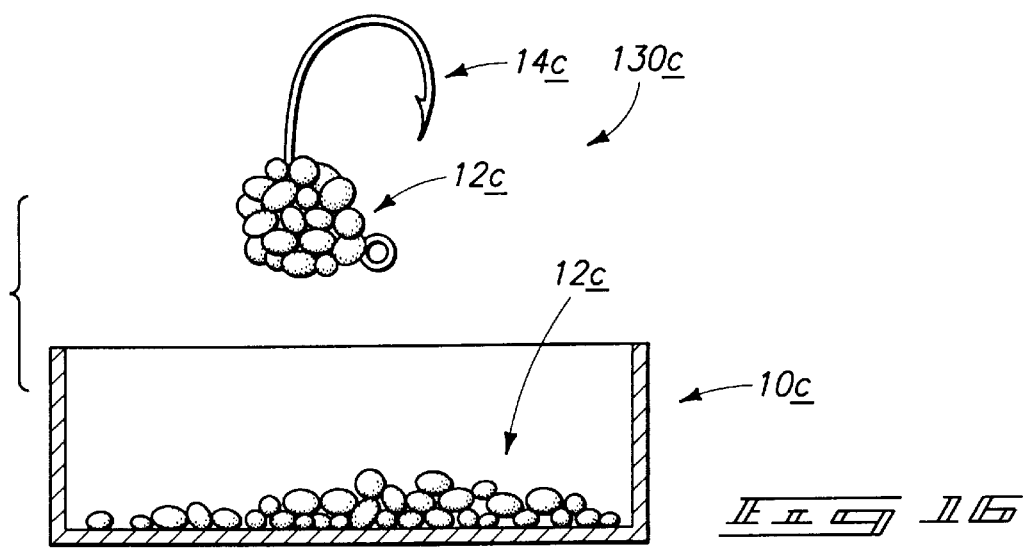
FIG. 16 illustrates the bait and fishhook of FIG. 14, at a fishhook-baiting step subsequent to that of FIG. 15.

Referring to FIGS. 15 and 16, jighead 132c is contacted with bait 12c and subsequently withdrawn from bait 12c. A portion of bait 12c is magnetically adhered to jighead 132c after jighead 132c is withdrawn from the remainder of bait 12c. Specifically, the magnetizable particles within bait 12c are magnetically attracted to the magnet of jighead 132c and are accordingly adhered to jighead 132c by magnetic forces.

FIG. 17 shows yet another embodiment assembly encompassed by the present invention. In referring to FIG. 17, similar numbering will be used to that utilized above in describing the embodiment of FIGS. 10–12, with the suffix "d" provided to indicate structures pertaining to the embodiment of FIG. 17. FIG. 17 shows a lure 130d comprising a fishhook 14d bound to a jighead 132d. A mass 170 is joined to the hook, and a magnet 172 is provided within the mass 170. Mass 170 can comprise, for example, a flexible material, such as, for example, a plastic, and can be removably attached to the hook by, for example, impaling mass 170 onto the hook. Mass 170 is shown in the shape of a flexible tail, but other shapes of mass 170 can be utilized, such as, for example, crawdad, fish or insect shapes. Magnet 172 can be bonded to mass 170 with, for example, an epoxy. Alternatively, if mass 170 is a molded material, magnet 172 can be provided within the material during the molding process to bond magnet 172 within the material of mass 170. The magnet 172 of the FIG. 17 embodiment can be considered to be joined to hook 14d through being bonded to a mass 170 that is joined to the hook.

Magnetic bait 12d (shown in the form of pellets) is adhered to magnet 172 through magnetic interactions. In particular embodiments, jighead 132d is also magnetic so that bait 12d is attracted to both jighead 132d and magnet 172. Although only one magnet is shown within mass 170, it is to be understood that a plurality of magnets could be provided within such mass.

FIG. 18 shows yet another embodiment assembly encompassed by the present invention. In referring to FIG. 18, similar numbering will be used to that utilized above in describing the embodiment of FIG. 17, with the suffix "e" provided to indicate structures pertaining to the embodiment of FIG. 18. FIG. 18 shows a lure 130e comprising a hook 14d bound to a magnet 190 which has a plurality of cavities 192 extending therein. Magnet 192 can be formed of a soft material (such as a flexible strip), and cavities 192 can be sized to retain one or more bait pellets (such as the bait pellets shown in FIG. 17).

The above-described embodiments can advantageously enable persons to bait fishhooks and jigs without having to touch and mold fishing bait. The invention can have particular advantages for ice fishing applications, in that an ice-fishing jig constructed in accordance with the present invention (for instance, the above-described jig 130 can be sized and shaped with a configuration which mimics conventional ice-fishing jigs) can be baited in accordance with the present invention without removing gloves. Specifically, the jig can be baited simply by dipping the jig into a bait having magnetizable particles dispersed therein and withdrawing the jig; rather than by having to engage in prior art practices of removing bait from a container and molding it with fingers to apply it to the jig.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method of adhering bait proximate a fishhook, comprising:
   providing a fishhook having a magnet joined thereto;
   providing a bait comprising a combination of fish attractant and magnetizable particles, the bait comprising a plurality of discrete pellets; and
   contacting at least one of the fishhook and the magnet with the bait, the magnetizable particles being attracted to the at least one of the fishhook and the magnet to adhere at least some of the bait proximate the fishhook.

2. The method of claim 1 wherein the magnet is bonded to material impaled on the fishhook.

3. The method of claim 1 wherein the bait comprises a plurality of magnets mixed with a dough-type fish attractant.

4. The method of claim 1 wherein the magnet is bonded to the fishhook with an epoxy.

5. The method of claim 1 wherein the fishhook and magnet together define a jig, the magnet being configured as a jighead for said jig.

6. A method of baiting a fish hook, comprising:
   providing a fish hook having a magnet joined thereto;
   providing a bait having a fish attractant and a plurality of magnetizable particles dispersed within the fish attractant, the magnetizable particles being separate, distinct pieces relative to one another;
   inserting the magnet within the bait;
   withdrawing the magnet from within the bait; and
   after the withdrawing, at least one of the magnetizable particles from the bait being adhered to the magnet through a magnetic interaction and at least a portion of the attractant being adhered to the at least one of the magnetizable particles that is adhered to the magnet.

7. The method of claim 6 wherein the fish attractant is configured to release odoriferous particles into water upon being submerged in the water.

8. The method of claim 6 wherein the magnetizable particles within the bait comprise permanent magnets.

9. A method of adhering bait proximate a fishhook, comprising:
   providing a fishhook having a magnet joined thereto;
   providing a bait comprising a combination of fish attractant and magnetizable particles; and
   contacting at least one of the fishhook and the magnet with the bait, the magnetizable particles being attracted to the at least one of the fishhook and the magnet to adhere at least some of the bait proximate the fishhook.

10. The method of claim 9 wherein the magnet is bonded to the fishhook with an epoxy.

11. The method of claim 9 wherein the fishhook and magnet together define a jig, the magnet being configured as a jighead for said jig.

12. A method of adhering bait proximate a fishhook, comprising:
    providing a fishhook having a first magnet joined thereto;
    providing a bait comprising a combination of fish attractant and second magnets; and
    contacting at least one of the fishhook and the first magnet with the bait, the second magnets being attracted to the at least one of the fishhook and the first magnet to adhere at least some of the bait proximate the fishhook.

13. A fish bait comprising a fish attractant and a plurality of magnetizable particles distributed throughout the fish attractant to a concentration sufficient to adhere a visible amount of the fish attractant to a magnet, the magnetizable particles being separate, distinct pieces relative to one another.

14. The fish bait of claim 13 wherein the magnetizable particles are magnets.

15. The fish bait of claim 13 wherein the bait is in the form of a plurality of pellets, individual pellets of the plurality of pellets comprising a mixture of the fish attractant and the magnetizable particles.

16. The fish bait of claim 13 wherein the magnetizable particles are magnets and the bait is in the form of a plurality of pellets, individual pellets of the plurality of pellets comprising a mixture of the fish attractant and the magnetizable particles.

17. The fish bait of claim 13 comprising the magnetizable particles to a concentration of from about 1% to about 99.9%, by weight.

18. The fish bait of claim 13 comprising the magnetizable particles to a concentration of from about 25% to about 95%, by weight.

19. The fish bait of claim 13 comprising a consistency of a dough.

20. The fish bait of claim 13 comprising a consistency of a granular solid.

21. The fish bait of claim 13 wherein the magnetizable particles have a minimum dimension of not more than 0.25 inch.

22. A baited fish hook assembly comprising:
    a magnet joined to a fish hook;
    a plurality of magnetizable particles magnetically adhered to the magnet, the magnetizable particles being separate, distinct pieces relative to one another; and
    a fish attractant adhered to the magnetizable particles, the fish attractant being configured to release odoriferous particles into water upon being submerged in the water.

23. The assembly of claim 22 wherein the fish hook comprises one or more planar side regions.

24. A fishing system, comprising:
    a fishhook having a first magnet bound thereto;
    a bait comprising a fish attractant and a plurality of second magnets distributed throughout the fish attractant to a concentration sufficient to adhere a visible amount of the fish attractant to the first magnet through magnetic forces.

25. A fishing jig, comprising:
    a fishhook;
    a jighead joined to the fishhook, the jighead comprising a magnet; and a plurality of discrete magnetizable particles magnetically attracted to the magnet of the jighead and having bait adhered thereto, the bait being at least partially water soluble.

26. The jig of claim 25 wherein the jighead is bonded to the fishhook with an epoxy.

27. The jig of claim 25 wherein the jighead has grooves extending therein, and at least some of the magnetizable particles having bait adhered thereto are at least partially within the grooves.

28. The jig of claim 25 wherein the magnetizable particles are magnets.

29. A fishhook assembly, comprising:
   a fishhook;
   a magnet joined to the fishhook; and
   a plurality of magnetizable particles magnetically attracted to the magnet of the fishhook and having bait adhered thereto, the bait being at least partially water soluble.

30. The assembly of claim 29 wherein the magnet has grooves extending therein, and at least some of the magnetizable particles having bait adhered thereto are at least partially within the grooves.

31. The assembly of claim 29 wherein the magnet has grooves extending therein, and at least some of the magnetizable particles having bait adhered thereto are entirely within the grooves.

32. The assembly of claim 29 wherein the magnetizable particles are magnets.

33. A fish bait having a plurality of separate and discrete first magnets dispersed therethrough wherein the first magnets are dispersed within a doughy fish attractant.

34. The fish bait of claim 33 wherein the first magnets are provided to a sufficient concentration to adhere a visible amount of the doughy fish attractant to a second magnet through magnetic interactions.

35. A fish bait comprising:
   a fish attractant; and
   a plurality of magnetizable particles dispersed within the fish attractant to a sufficient concentration to adhere a visible amount of the fish attractant to a first magnet through magnetic interactions.

36. The fish bait of claim 35, wherein the magnetizable particles are second magents.

* * * * *